March 30, 1948.  E. W. BERGER  2,438,493
WATER VEHICLE
Filed Jan. 5, 1944  3 Sheets-Sheet 1

INVENTOR.
EMRIC W. BERGER
BY
Bales, Pease, & McBean
ATTORNEYS

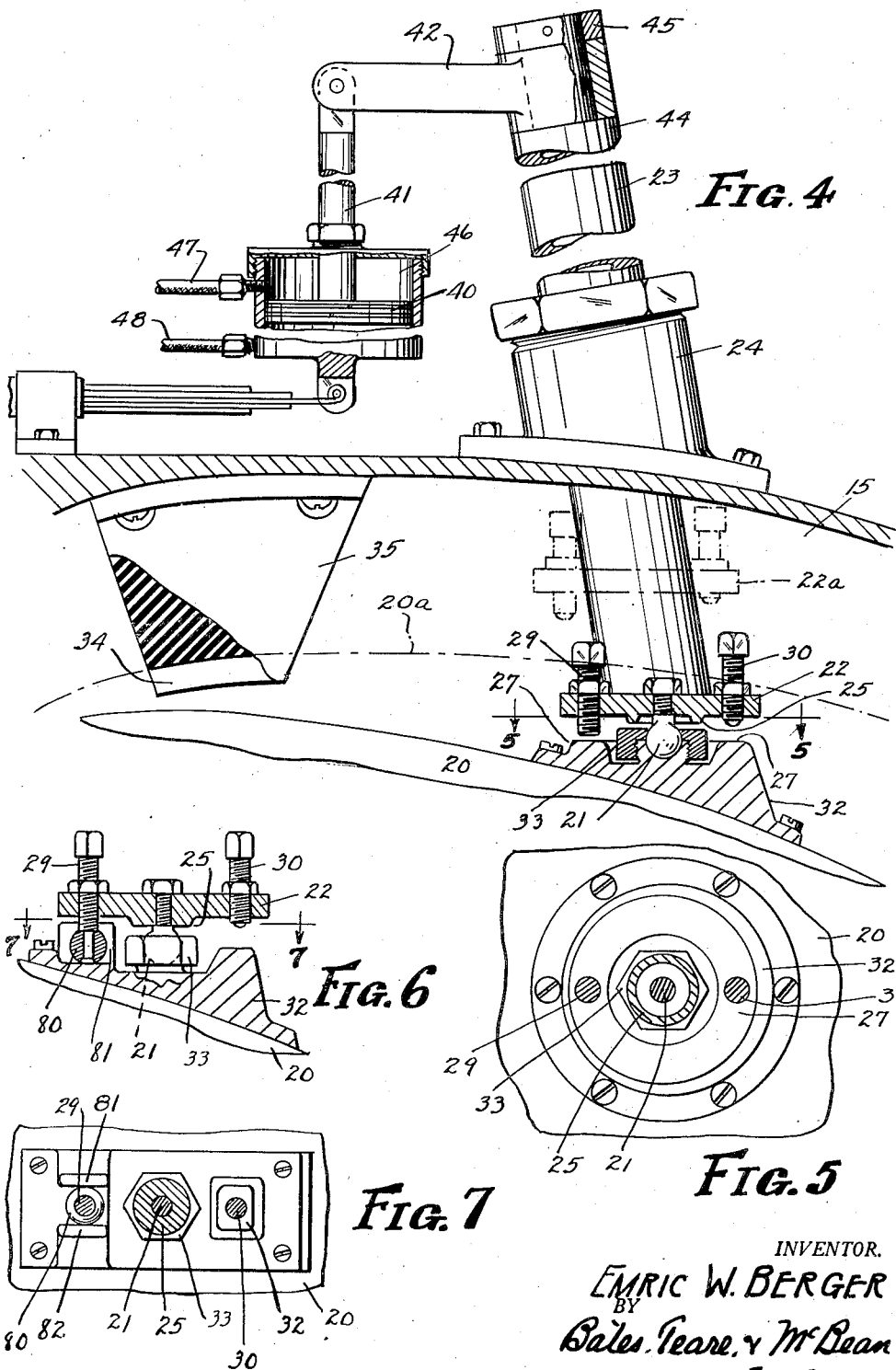

March 30, 1948.  E. W. BERGER  2,438,493
WATER VEHICLE
Filed Jan. 5, 1944  3 Sheets-Sheet 3
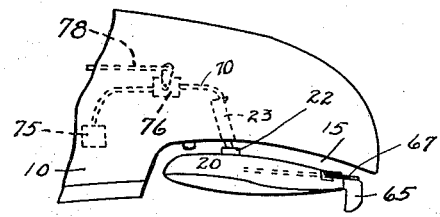
FIG. 8
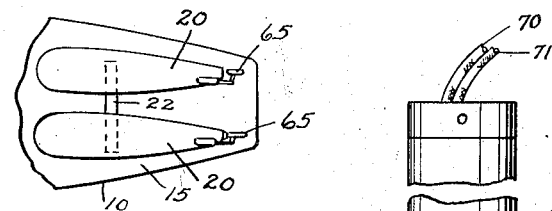
FIG. 9
FIG. 10
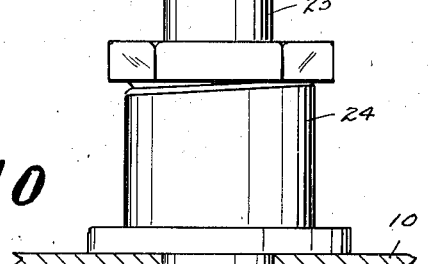
FIG. 11
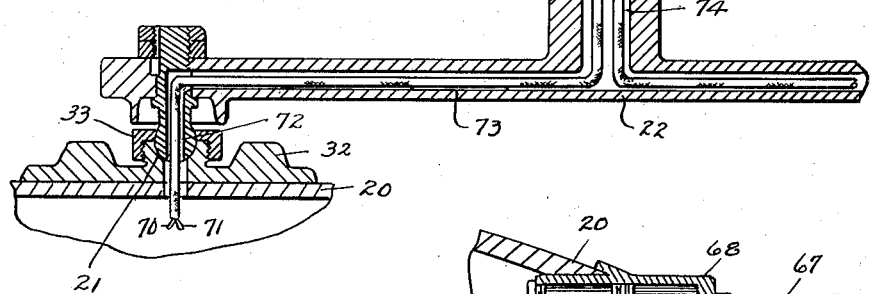
INVENTOR.
EMRIC W. BERGER
BY
Bates, Teare & McBean
ATTORNEYS Patented Mar. 30, 1948

2,438,493

UNITED STATES PATENT OFFICE 2,438,493

WATER VEHICLE

Emric W. Berger, San Diego, Calif.

Application January 5, 1944, Serial No. 517,000

9 Claims. (Cl. 114—66.5)

This invention pertains to water vehicles, particularly to speed boats. In the operation of speed boats, the stern drops down into the water progressively as the bow is lifted out of the water, thereby materially changing the trim of the hull, increasing the resistance and necessitating long radius turns at high speed.

The principal object of the present invention is to provide a mechanism which when used on speed boats will prevent drastic changes in the fore and aft trim as the speed of the ship is varied, and to provide means for enabling the boat to carry a greater load with less horsepower and be turned at high speed on a relatively short radius.

I accomplish the foregoing objects by utilizing float means at the stern of the ship and providing for relative movement between the float and the hull, not only in a vertical, but also in a lateral tilting direction so as to increase the buoyancy at the stern of the ship as the speed increases, and vice versa. By utilizing a pair of floats and mounting them for self-castering movement with respect to the hull, the floats will automatically follow the wake of the ship and thereby reduce trim and resistance as well as to facilitate turning on a short radius.

Figure 1:
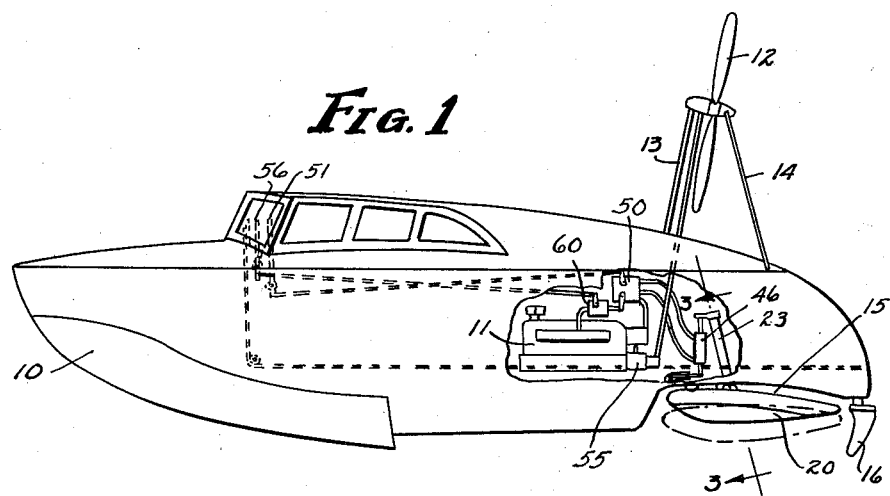
Figure 2:
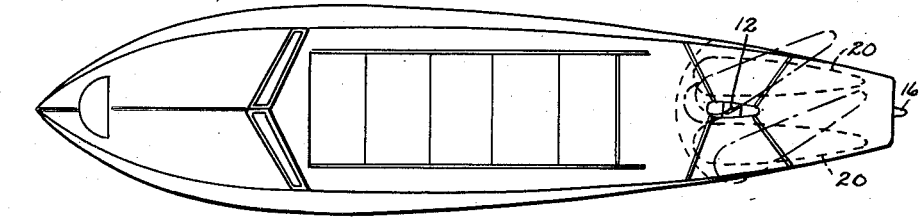
Figure 3:
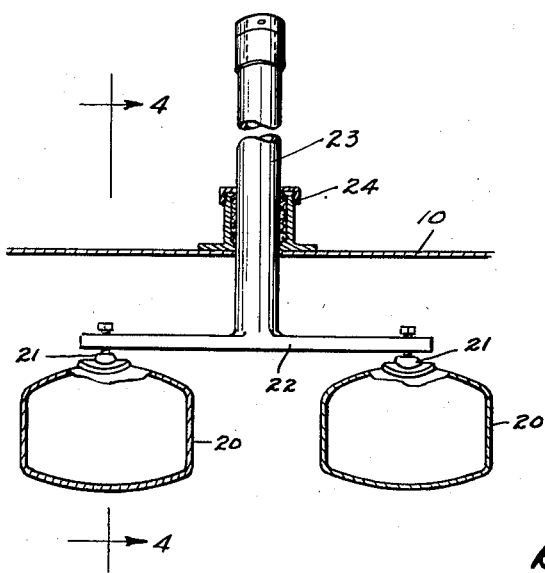

Referring now to the drawings, Fig. 1 is a side view of a speed boat embodying my invention; Fig. 2 is a top plan view of the vehicle shown in Fig. 1; Fig. 3 is a section taken on the line 3—3 of Fig. 1; Fig. 4 is a section taken on the line 4—4 in Fig. 3, but on a larger scale than that used in Fig. 3; Fig. 5 is a section taken on the line 5—5 in Fig. 4; Fig. 6 is a section through the float or pontoon adjusting device showing a modified form of construction; Fig. 7 is a section taken on the line 7—7 in Fig. 6; Fig. 8 is a diagrammatic view illustrating the use of rudders that are mounted directly on the pontoons instead of on the stern of the hull; Fig. 9 is a bottom plan view of the arrangement shown in Fig. 8; Fig. 10 is a section through the pontoon supporting mechanism showing the arrangement for controlling the rudders at the ends of the pontoons, and Fig. 11 is a sectional view illustrating operating mechanism for the rudders adjacent the ends of the pontoons.

My invention is shown in connection with a speed boat having a hull 10 in which is mounted an internal combustion engine 11 which is operatively connected to a propelling device in the form of an aircraft propeller 12 which is supported by suitable struts 13, 14 adjacent the stern portion of the hull. The bottom of the hull at the stern has a recess 15 therein within which preferably a pair of floats are mounted for movement in unison with respect to the hull. Steering means in the form of a rudder 16 is shown in Fig. 1 as being mounted on the hull rearwardly of the floats 20.

The function of the floats 20 is to increase the buoyancy of the stern portion of the ship as the stern drops into the water progressively as the speed increases. To accomplish such purpose, provision is made for increasing the relative vertical distance between the floats and the bottom of the hull progressively as the speed increases. This may be performed either by a manual operation, or automatically, as will hereinafter be set forth.

In the preferred arrangement, I utilize a pair of floats which as shown in Fig. 3 are connected, as by ball and socket joints 21, to a cross member 22, and the cross member in turn is mounted for movement toward and away from the bottom of the hull and for rotative movement with respect to the hull. The preferred form of such mounting includes a spindle 23 which extends upwardly into the boat on the longitudinal center line thereof, and through a watertight bearing 24. Each ball and socket joint 21 provides a swivel connection, allowing substantially universal movement of each float with respect to the cross member, but the extent of such permissible movement is purposely limited in a transverse direction to about 5°, and in a fore and aft direction to about an amount less than 5°. The transverse tilting movement may be limited by an annular shoulder 25 on the bottom of the cross member 22, which is adapted to engage the top of a ball retainer or socket member 33, whereas the fore and aft tilting movement may be limited by stops on the fore and aft sides respectively of the ball joint. The latter movement is preferably adjustable and may be obtained by set screws 29 and 30 on the arm 22 which carries the ball part of each joint, whereas the shoulder 27 with which the said screws coact may be an annular rib disposed on a pad 32, which is fastened to the pontoon, and which carries the socket part 33 of the joint.

The purpose of the fore and aft tilting adjustment of each pontoon is to permit whatever adjustment is necessary to obtain the proper degree of trim when the floats are in retracted or uppermost position, as shown by the broken lines 20a in Fig. 4. At such time the cross member is in the broken line position 22a, and the nose of each pontoon is arranged to fit snugly against a downwardly arched portion 34 in a rubber bumper 35 that is fixed to the bottom of the hull within the recessed portion thereof. The lateral tilting of the pontoon with respect to the cross member is merely to facilitate the castering of the pontoons whenever they are turned as a unit about the axis of the spindle 23. By inclining the spindle upwardly and forwardly as shown in Figs. 1 and 4, then whenever the spindle is rotated, the cross member 22 is correspondingly turned and due to the inclination of the spindle, one pontoon moves forwardly and downwardly, while the other moves rearwardly and upwardly, wherefore, the buoyancy of the boat is increased on one side and decreased on the other. Inasmuch as the spindle 23 is free to turn, the pontoons are free to follow the wake of the ship and thereby to aid in maintaining better balance during sharp turning movements.

To effect a raising and lowering of the pontoons with respect to the hull, I provide a piston 40, the rod 41 of which may be connected to an arm 42 that is loosely mounted on the spindle 23. The arm, however, is prevented from moving axially of the spindle by means of the shoulder 44 on the spindle that engages the bottom of the arm by means of a collar 45 which engages the top of the arm. The piston 40 is movable vertically within a cylinder 46 and provision is made for introducing compressible fluid under pressure into the cylinder on each side of the piston through conduits 47 and 48, respectively. These conduits are directly connected to a control device which includes a valve 50 with suitable mechanism for operating the valve either manually or automatically. When the manual device is used, the device such as the lever 51 adjacent the pilot station in the bow of the boat may be connected to the control valve 50 for controlling the flow of fluid from a pump 55 into the respective conduits 47 or 48 so as to raise or lower the spindle 23 together with the associated pontoons with respect to the bottom of the hull.

Where the automatic control is utilized, I have shown a lever 56 adjacent the pilot's station for controlling an auto-servo device indicated in general at 60 as being connected to the intake manifold of the engine. The term "auto servo" device as used herein means the customary cylinder with a piston therein, wherein the piston is actuated by the intake pressure of the engine as a source of power, and where movement of the piston actuates the valve mechanism 50 to control the flow of fluid from the pump 55 as aforesaid. The arrangement within the valve device 50 is such that when either the manual or the automatic device is operating, the piston 40 is arranged to force the pontoons downwardly with respect to the bottom of the hull progressively as the speed increases, and to allow the return of the pontoons progressively as the speed decreases, whereby the buoyancy of the stern is controlled and the fore and aft trim is kept within desired limits.

In the form illustrated in Fig. 1, the rudder 16 is mounted upon the hull of the boat and is controllable from the pilot's station in the usual way. I may, however, desire to dispense with the rudder on the hull and use a rudder at the stern of each float as indicated at 65 in Figs. 8 and 9. To operate such rudders I have illustrated in Fig. 11 a rudder arm 66 which is connected to a piston rod 67 that projects into a cylinder 68 which is mounted on the stern portion of each float. A piston 69 attached to the rod 67 is operable within the cylinder 68 under the influence of fluid under pressure which is admitted into the cylinder on opposite sides of the piston through conduits 70 and 71, respectively. Preferably, these conduits are disposed inside the pontoons and are flexible members that are brought out through a passageway 72 in the ball joint, then through a passageway 73 in the cross member 22, upwardly through a passageway 74 in the spindle 23 and are connected to a source of fluid pressure such as an oil pump, indicated in general at 75 in Fig. 8. A valve 76 directs the flow of fluid from the source of supply to the various conduits to control the pistons 69, and such valve may be operated at the pilot's station through the medium of a connecting member 78. An advantage of mounting the rudders on the pontoons is that they operate in "green" water off the hull fantail.

While I have illustrated and described the buoyant pontoons as being freely swingable about the axis of each ball joint, I may, if desired, restrict swinging movement about each ball joint in a rotative direction while still allowing provision for a tilting movement in a lateral and fore and aft direction. In either case, however, the spindle 23 is still rotatable about its own axis. A modified construction, therefore, shown in Fig. 6, illustrates a device somewhat similar to the adjusting structure adjacent the ball joint of Fig. 4. Substantially the only difference between the structure of Fig. 6 and that of Fig. 4 is the fact that in Fig. 6 the adjusting screw 29 carries a ball 80 at the lower end thereof, and that the ball is disposed between ears 81 and 82 which extend upwardly from the pad 32. The axes of the adjusting screws 29 and 30 are in alignment with the axis of the ball joint 21 and on the longitudinal center line of the pontoon. Accordingly, the modified construction still allows the pontoon to tilt in a fore and aft direction within limits fixed by the adjusting screws, and also to tilt transversely within the limits fixed by the annular shoulder 25 which is adapted to engage the top of the socket member 33.

An advantage of a speed-boat equipped with my invention is the fact that the stern of a speed-boat is prevented from dropping into the downwash as the speed increases, whereby the fore and aft trim of the boat is maintained more nearly uniform or within desired limits at all speeds. The self-castering arrangement of the pontoons with respect to the hull permits automatic following of the wake in rough water, or in turning maneuvers and aids materially in shortening the radius of a permissible turn. The term "self-castering" as used herein means the universal movement of a float with respect to the supporting member, coupled with the tilting of the mounting spindle, whereby the float is free to follow the wake of the boat.

Inasmuch as the pontoons are supported by a cushion of compressible fluid, they are free to move up and down with changes in the downstream from the forward hull area, and such movement (that of pitching) is not transmitted to the boat. Pitching of the boat is also reduced as the varying angle caused by the stern movement is never permitted to amplify. Moreover, directional stability is greatly increased because the pontoons have a self-centering castering action whereby the boat will remain on its course even if the wheel is left unattended.

By virtue of the arrangement which enables the pontoons to be retracted into neutral position beneath the stern end of the boat in speeds below planing action, the correct angle of trim on the pontoons is automatically obtained by contact with the rubber bumpers on the bottom of the boat and adjacent the forward portions of the pontoons. In this position the boat may be driven astern at very high speed because of the correct angle of trim on the pontoons which prevents the transom from digging in. On forward movement the constantly adjustable movement up and down of the pontoons eliminates the requirement for the exact location of the center of buoyancy whereby heavy loads can be carried on either side of the center of buoyancy because the correct trim will be mechanically controlled.

I claim:

1. A water vehicle having in combination, a hull, propelling means therefor, a buoyant float disposed on each side of the longitudinal center of the hull adjacent the stern thereof, a member connecting the floats for movement in unison with respect to the hull, means for mounting the member beneath the hull and means for swivelly connecting the member to each float.

2. A water vehicle having in combination, a hull, propelling means therefor, a buoyant float disposed on each side of the longitudinal center of the hull adjacent the stern thereof, a member connecting the floats for movement in unison with respect to the hull, each float being connected for universal movement to said member, a spindle attached to said member and journalled in said hull, said spindle having its axis inclined upwardly and forwardly with reference to the hull, whereby the floats are canted whenever the spindle is turned.

3. A water vehicle having in combination, a hull, propelling means therefor, the hull having a recess in its bottom portion, buoyant floats disposed within said recess, a member having a ball and socket connection with each of said floats, a spindle attached to said member and mounted within the hull for axial and rotative movement with respect to the hull, and means associated with each ball and socket joint for limiting movement of each float with respect to said member.

4. A water vehicle having in combination, a hull, propelling means therefor, a pair of buoyant floats mounted beneath the hull adjacent the stern thereof, a spindle extending upwardly into the hull and being located on the longitudinal center line thereof, means beneath the hull connecting the spindle to each of said floats, said means including a ball and socket connection with each float, said spindle being axially shiftable for moving the floats upwardly and downwardly with respect to the hull, and said spindle being freely rotatable whereby the floats can follow automatically the wake of the vehicle.

5. In a water vehicle having a hull, a recess on the bottom adjacent the stern thereof, a pair of buoyant floats disposed within said recess, a member interconnecting the floats, a spindle attached to said member and journalled in said hull for movement upwardly and downwardly with respect to the hull and for turning movement with respect to the hull, said member having a ball and socket joint connection with each float, each float being tiltable about its said joint with respect to said member, and means for adjustably limiting the tilting in a fore and aft direction.

6. In a water vehicle, a hull, a pair of buoyant floats disposed beneath the hull, a member for holding the floats in spaced relationship to each other, said member having a universal joint connection with each float and having a portion thereof extending upwardly into said hull and being mounted therein for movement into and out of the hull, and also for rotative movement with respect to the hull, whereby the floats are supported in self-castering position and are adapted to be raised or lowered as a unit with respect to the hull, power means acting on said portion for effecting the movement of the floats away from the hull.

7. In a water vehicle, a hull having a recess on its bottom adjacent the stern thereof, a pair of floats disposed beneath the hull within said recess, means for raising and lowering the floats as a unit with respect to the hull so as to vary the buoyancy of the stern portion thereof, a rudder mounted on the stern of each float and means for operating the rudders independently of the floats.

8. In a water vehicle, a hull, a pair of buoyant floats disposed beneath the hull and mounted for movement in unison toward and away from the hull and for turning movement as a unit with respect to the hull, said mounting including a cross member having a spindle adjacent its mid-portion extending upwardly into the hull, there being a hollow passageway extending through the member and spindle, fluid carrying conduits extending through the passageway, a source of fluid supply at one end of each conduit, a working cylinder on each float, the other end of each conduit being connected to one of said cylinders, a piston in each cylinder, a rudder mounted at the stern of each float and means connecting each rudder to one of said pistons.

9. In a water vehicle, a hull, a pair of floats disposed beneath the hull adjacent the stern portion thereof, a member having a ball and socket connection with each float, a spindle attached to the member adjacent the mid-portion thereof and extending upwardly into the hull, means within the hull acting upon said spindle to move it in an axial direction, whereby the floats may be raised and lowered in unison with respect to the hull, said member having a pair of adjusting screws disposed in alignment with the axis of each ball and socket connection and on the longitudinal center line of the float, one of the adjusting screws having a portion thereof operable in a guideway carried by the float for restricting rotative movement of the float with respect to the member, but allowing tilting of the float in a fore and aft direction with respect to said member.

EMRIC W. BERGER.

REFERENCES CITED

The following references are of record in the file of this patent:

UNITED STATES PATENTS

| Number | Name | Date |
| --- | --- | --- |
| 1,683,276 | Woods | Sept. 4, 1928 |
| 1,846,602 | Lake | Feb. 23, 1932 |
| 1,875,135 | Plum | Aug. 20, 1932 |
| 2,139,303 | Grunberg | Dec. 6, 1938 |